June 19, 1928.

T. C. HOLZ ET AL

WATER FILTER

Filed Feb. 28, 1927

1,674,203

INVENTORS.
THOMAS CLIFFORD HOLZ.
EDGAR L. PEGG.
BY.

*H. A. Dreckman*
ATTORNEY.

Patented June 19, 1928.

1,674,203

UNITED STATES PATENT OFFICE.

THOMAS CLIFFORD HOLZ AND EDGAR L. PEGG, OF LONG BEACH, CALIFORNIA.

WATER FILTER.

Application filed February 28, 1927. Serial No. 171,418.

An object of our invention is to provide a water filter in which the water is first directed through a ceramic filtering medium and then through a filter bed formed of vegetable and mineral material or the like, and a feature of this arrangement is that the water is positively directed through the charcoal filter bed.

Another object of our invention is to provide a filter which may be readily taken apart for cleaning and replacement of parts and which may be again quickly assembled.

A further object is to provide a filter which is simple in construction and effective in operation.

Other objects, advantages, and features of invention may appear from the accompanying drawing, the subjoined detailed description, and the appended claims.

In the drawing—

Figure 1:
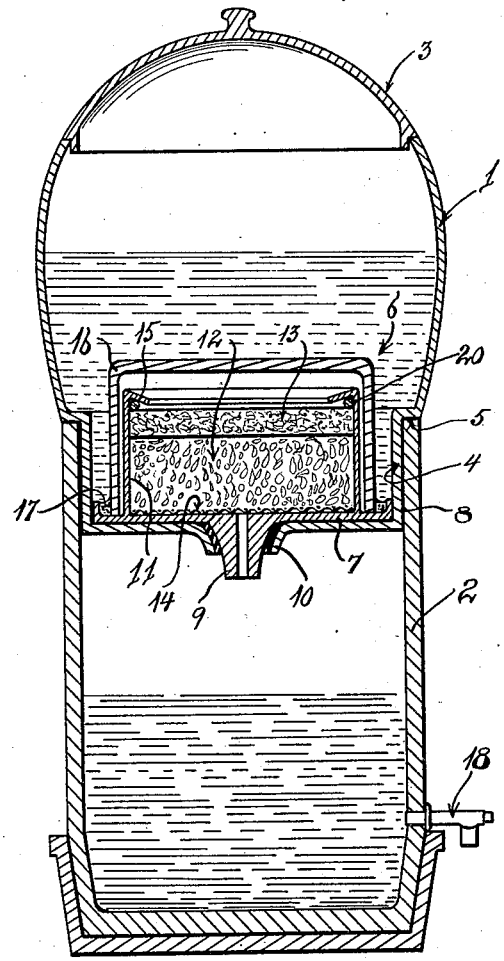
Fig. 1 is a longitudinal sectional view of our improved filter.

Referring more particularly to the drawing:

Our filter comprises an upper container 1 and a lower container 2. A cover 3 is provided on the upper container whereby the water in said container may be replenished. The container 1 is provided with a basin 4 which fits within the container 2 and a shoulder 5 on the container 1 rests on top of the container 2, thus mounting the containers in juxtaposition.

A filtering element 6 is positioned in the basin 4 and comprises a tray 7 having upturned edges 8 and a central spout 9. The spout 9 extends through the bottom of the basin 4 and a rubber gasket 10 is provided around said spout thereby preventing leakage of water past said spout. An annular wall 11 rises from the tray 7 and is integral therewith, and within the wall 11 we place a bed of vegetable and mineral filtering material (such as charcoal) 12. Above the charcoal bed 12 we provide a layer of asbestos felt, or the like, 13. A fine screen 14 rests on the bottom of the filtering element 6 and extends over the spout 9.

In order that the water which enters over the annular wall 11 shall not pass downwardly adjacent said wall and thus not enter the charcoal and asbestos, we have provided a flat ring 15 at the top of the wall 11 thereby directing the water towards the center and compelling its passage through the asbestos and charcoal before it may enter the compartment, said ring being integral with the wall 11 and formed by bending the upper end inwardly.

The tray 7 and wall 11 is formed of a material which is impervious to water. A ceramic filtering cup 16 extends over the wall 11, the bottom thereof resting in the tray 7, and a suitable cement, as shown at 17, seals the bottom of the cup 16 thus preventing the passage of water around the bottom thereof. The water passing through the ceramic cup 16 has most of the impurities removed therefrom and in passing through the asbestos layer 13 and charcoal bed 12 the water is bleached and enters the compartment 2 in a clear and pure condition. A spout 18 enables the water to be withdrawn from the compartment 2.

Figure 2:
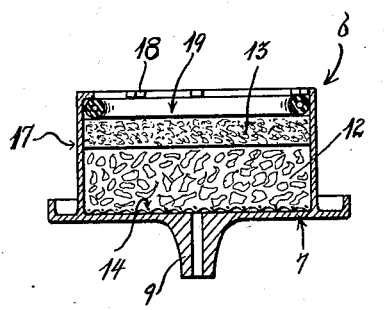
Fig. 2 is a longitudinal sectional view of a slightly modified form of filtering element.

In Fig. 2 we have shown a slightly modified form of filtering element. The tray 7 is provided with an annular wall 17 rising therefrom and a plurality of lips 18 are provided adjacent the upper end thereof, and a rubber ring 19 fits under said lips. The ring 19 is preferably split and provided with a spring ring therein which holds the ring 19 securely against the wall 17, thus packing off the wall at the top thereof and causing the water to pass over the ring 19 and enter the charcoal bed 12.

When it is desired to clean our filter it is only necessary to remove the filter element 6 from the compartment 1 and by melting the cement 17 the cup 16 is removed exposing the charcoal bed 12 and asbestos layer 13 which may be quickly and easily replaced.

To hold the asbestos layer 13 and charcoal bed 12 securely in place we may provide a spring ring 20 under the flat ring 15 which presses downwardly on the said layers to hold them securely in position.

Having described our invention, we claim:

1. A water filter comprising upper and lower compartments, a filter element in said upper compartment comprising a tray impervious to water, a spout depending from said tray and extending into the lower compartment, an annular wall rising from said tray, said wall being impervious to water, a ceramic filtering cup positioned over said wall, and resting in said tray, and means to direct the water towards the center of the space inclosed by said annular wall.

2. A water filter comprising upper and lower compartments, a filtering element in said upper compartment comprising a tray, a spout depending from said tray and extending into the lower compartment, an annular wall rising from said tray, a ceramic filtering cup positioned over said wall and resting in said tray, and means to direct the water towards the center of said annular wall, said means comprising an annular ring extending inwardly from said annular wall, a charcoal bed on the tray within the wall, and a screen under said charcoal bed, said screen extending over said spout.

3. A water filter comprising an upper compartment and a lower compartment, said upper compartment being provided with a basin adapted to fit into the lower compartment, a filtering element positioned in said basin, said filtering element comprising a tray, a spout depending from said tray, said spout extending through the basin into the lower compartment, a rubber packing about the spout, an annular wall rising from the tray, said annular wall being adapted to enclose a vegetable and mineral filter bed, means adapted to direct the water towards the center of said filter bed, a ceramic filter cup extending over said wall and resting in the tray, and means to seal the bottom of said filter cup.

4. A water filter comprising an upper compartment and a lower compartment, said upper compartment being provided with a basin adapted to fit into the lower compartment, a filtering element positioned in said basin, said filtering element comprising a tray, a spout depending from said tray, said spout extending through the basin into the lower compartment, a rubber packing about the spout, an annular wall rising from the tray, said annular wall being adapted to enclose a vegetable and mineral filter bed, means adapted to direct the water towards the center of said filter bed, said means comprising an annular inwardly extending ring integral with said wall, a ceramic filter cup extending over said wall and resting in the tray, and means to seal the bottom of said filter cup, and a spring ring adapted to bear against the filter bed to hold the same in position.

5. A water filter comprising an upper compartment and a lower compartment, said upper compartment being provided with a basin adapted to fit into the lower compartment, a filtering element positioned in said basin, said filtering element comprising a tray, a spout depending from said tray, said spout extending through the basin into the lower compartment, a rubber packing about the spout, an annular wall rising from the tray, said annular wall being adapted to enclose a vegetable and mineral filter bed, means adapted to direct the water towards the center of said filter bed, said means comprising an annular inwardly extending ring integral with said wall, a ceramic filter cup extending over said wall and resting in the tray, and means to seal the bottom of said filter cup.

In testimony whereof, we affix our signatures.

THOMAS CLIFFORD HOLZ.
EDGAR L. PEGG.